United States Patent
Mason et al.

(10) Patent No.: US 12,121,003 B2
(45) Date of Patent: Oct. 22, 2024

(54) AUTOMATIC STALL LATCH DEVICE

(71) Applicants: Todd Mason, Cape Vincent, NY (US); Angela Harrison, Monticello, FL (US)

(72) Inventors: Todd Mason, Cape Vincent, NY (US); Angela Harrison, Monticello, FL (US)

( * ) Notice: Subject to any disclaimer, the term of this patent is extended or adjusted under 35 U.S.C. 154(b) by 147 days.

(21) Appl. No.: 18/049,385

(22) Filed: Oct. 25, 2022

(65) Prior Publication Data
US 2023/0131112 A1 Apr. 27, 2023

Related U.S. Application Data

(60) Provisional application No. 63/271,385, filed on Oct. 25, 2021.

(51) Int. Cl.
| | | |
|---|---|---|
| *E05B 65/08* | (2006.01) | |
| *A01K 1/00* | (2006.01) | |
| *E05B 17/20* | (2006.01) | |
| *E05B 65/00* | (2006.01) | |
| *E05C 17/54* | (2006.01) | |

(52) U.S. Cl.
CPC ........ *A01K 1/0017* (2013.01); *E05B 65/0835* (2013.01); *E05B 17/2015* (2013.01); *E05B 65/0007* (2013.01); *E05B 65/0888* (2013.01); *E05C 17/54* (2013.01); *Y10S 292/36* (2013.01)

(58) Field of Classification Search
CPC ............. E05B 17/2015; E05B 65/0835; E05B 65/0888; E05B 65/0007; E05B 65/08; E05C 17/54; E05C 17/12; E05C 17/443; Y10S 292/36; Y10S 292/15; Y10T 292/65; Y10T 292/34; Y10T 292/67; Y10T 292/1031; Y10T 292/71; Y10T 292/73; Y10T 292/37; E05F 5/003; E05F 1/16
See application file for complete search history.

(56) References Cited

U.S. PATENT DOCUMENTS

| | | | | |
|---|---|---|---|---|
| 2,759,752 | A * | 8/1956 | Demings | E05C 1/16 |
| | | | | 292/173 |
| 3,259,936 | A * | 7/1966 | Sheridan | E05C 17/32 |
| | | | | 74/532 |
| 3,498,658 | A * | 3/1970 | Floyd | A01K 1/0017 |
| | | | | 292/171 |
| 3,608,940 | A * | 9/1971 | Mueller | E05B 65/0888 |
| | | | | 292/262 |
| 4,114,935 | A * | 9/1978 | Malo | E05B 83/02 |
| | | | | 49/449 |

(Continued)

*Primary Examiner* — Christine M Mills
*Assistant Examiner* — Faria F Ahmad
(74) *Attorney, Agent, or Firm* — Brennan, Manna & Diamond, LLC

(57) ABSTRACT

The present invention relates to a novel automatic stall latch device. The device is a secure, automatic latch for stall doors that house livestock, but can be retrofitted to any sliding door. The device comprises a locking plate and a wedge that the locking plate slides over to lock the door. A narrow rod is then installed on the side of the sliding door to operate the automatic latch. The locking plate is bolted to the top of the stall or sliding door and operated via the narrow rod that runs down the side of the door. The rod can be actuated to open the stall door. When the door is closed, the locking plate automatically connects to the wedge component that bolts to the top of the stall wall next to the closed door.

12 Claims, 4 Drawing Sheets

(56) References Cited

U.S. PATENT DOCUMENTS

| | | | | |
|---|---|---|---|---|
| 4,189,174 A * | 2/1980 | Van Parys | E05B 65/0835 | 70/99 |
| 4,263,795 A * | 4/1981 | Van Gompel | E05C 9/043 | 292/DIG. 32 |
| 4,274,666 A * | 6/1981 | Peck | E05B 65/0823 | 292/DIG. 47 |
| 4,290,368 A * | 9/1981 | Mazzini | B61D 19/026 | 49/362 |
| 4,461,500 A * | 7/1984 | van der Horst | E05B 65/0835 | 292/DIG. 46 |
| 4,502,807 A * | 3/1985 | Salice | E05C 19/10 | 403/231 |
| 4,778,205 A * | 10/1988 | Sayre | E05B 17/2088 | 292/171 |
| 5,127,689 A * | 7/1992 | Jarvis | E05B 65/0888 | 292/339 |
| 5,285,596 A * | 2/1994 | Kinsey | E05F 1/16 | 49/404 |
| 5,291,631 A * | 3/1994 | Schjoneman | E05F 5/04 | 16/82 |
| 5,609,371 A * | 3/1997 | Mader | E05C 5/00 | 292/164 |
| 5,937,478 A * | 8/1999 | Regnier | E05F 1/16 | 16/77 |
| 6,003,911 A * | 12/1999 | Sowash | E05C 17/025 | 292/288 |
| 6,327,879 B1 * | 12/2001 | Malsom | E05B 65/0811 | 292/210 |
| 7,874,597 B2 * | 1/2011 | Tomita | A47B 88/463 | 312/334.44 |
| 8,402,606 B1 * | 3/2013 | Tsai | E05F 5/003 | 16/49 |
| 10,647,229 B2 * | 5/2020 | Traiser | B60N 2/0715 | |
| 11,459,806 B1 * | 10/2022 | Bishop | E05C 17/04 | |
| 11,828,093 B1 * | 11/2023 | Russo | E05C 17/54 | |
| 2003/0106458 A1 | 6/2003 | Inage | E05B 65/08 | 105/341 |
| 2003/0150247 A1 * | 8/2003 | Talpe | E05B 65/0841 | 70/210 |
| 2011/0254293 A1 * | 10/2011 | Duff | E05C 17/025 | 292/343 |
| 2012/0169074 A1 * | 7/2012 | Sullivan | E05C 17/60 | 292/342 |
| 2012/0192493 A1 * | 8/2012 | Wolfe | E05B 65/08 | 292/341.19 |
| 2016/0340955 A1 * | 11/2016 | Zimmer | A47B 88/483 | |
| 2016/0369548 A1 * | 12/2016 | Dodge | E05F 3/224 | |
| 2020/0300009 A1 * | 9/2020 | Miller | E05C 17/025 | |

* cited by examiner

AUTOMATIC STALL LATCH DEVICE

CROSS-REFERENCE TO RELATED APPLICATION

The present application claims priority to, and the benefit of, U.S. Provisional Application No. 63/271,385, which was filed on Oct. 25, 2021, and is incorporated herein by reference in its entirety.

FIELD OF THE INVENTION

The present invention relates generally to the field of automatic stall latch devices. More specifically, the present invention relates to an improved automatic stall latch device that provides livestock or barn doors with an automatic locking latch designed to prevent injury to animals when entering or exiting the stall. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in automatic stall latch devices. Generally, securing livestock in stalls can be a difficult process. Animals can open stall doors to escape and cause serious injury to themselves and others. Some animals could even be injured when entering and exiting a standard stall.

Furthermore, decorative, sliding barn doors are being used within residential homes more and more. These doors tend to slide open easily and do not remain closed, causing privacy issues as well as aesthetic concerns.

It would be desirable to provide an automatic latching device for a sliding door, such as a stall door or barn door. Further, the device should be able to be retrofitted to any sliding door as is known in the art. The device should automatically latch a sliding door when the door is slid closed.

Therefore, there exists a long-felt need in the art for an automatic stall latch device that provides livestock doors with an automatic locking latch designed to prevent injury to animals when entering or exiting the stall. There is also a long-felt need in the art for an automatic stall latch device that features a locking plate and wedge that accommodates a plate, allowing the plate to slide over the lock and be secured with a narrow rod. Further, there is a long-felt need in the art for an automatic stall latch device that eliminates the need for farmers and ranchers to manually apply the latch. Moreover, there is a long-felt need in the art for a device that reduces the chance of injury to any animals inside the stall. Further, there is a long-felt need in the art for an automatic stall latch device that can be retrofitted to any sliding door. Finally, there is a long-felt need in the art for an automatic stall latch device that automatically locks a sliding door in a closed position.

The subject matter disclosed and claimed herein, in one embodiment thereof, comprises an automatic stall latch device. The device is a secure, automatic latch for stall doors that house livestock, but can be retrofitted to any sliding door. The device comprises a locking plate and a wedge that the locking plate slides over to lock the door. A narrow rod is then installed on the side of the sliding door to operate the automatic latch. The locking plate is bolted to the top of the stall or sliding door and operated via a lever (or the narrow rod) that runs down the side of the door. The lever can be actuated to open the stall door. When the door is closed, the locking plate automatically connects to a wedge component that bolts to the top of the stall wall, next to the closed door. Thus, the device can automatically lock and unlock the sliding door for animals entering and exiting the stall.

In this manner, the automatic stall latch device of the present invention accomplishes all of the foregoing objectives and provides users with a device that eliminates the need for farmers and ranchers to manually apply the latch for a sliding door. The device reduces the chance of injury to any animals inside the stall. The device can be retrofitted to any sliding door.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an automatic stall latch device. The device is a secure, automatic latch for stall doors that house livestock, but can be retrofitted to any sliding door. The device comprises a locking plate component and a wedge component that the locking plate slides over to lock the door. A narrow rod is then installed on the side of the sliding door to operate the automatic latch and allow the door to be slid open. Thus, the device can automatically lock and unlock the sliding door for animals entering and exiting the stall.

In one embodiment, the automatic stall latch device is shown for use on a sliding door, such as a barn door or stall door, but can be used on any suitable sliding door as is known in the art, depending on the needs and/or wants of a user. Specifically, the sliding door is shown mounted to slide along an opening and adapted to close the opening in the frame of a building. The sliding door would be any conventional sliding door as is known in the art. The top of the sliding door would be mounted to the top of the door frame via rollers or any other suitable means which allow the sliding door to slide open and close. Further, the automatic stall latch device is applied to the sliding door, and the door frame or wall adjacent to the door opening, in which the sliding door is hung.

In one embodiment, the automatic stall latch device comprises a locking plate component which is secured to the sliding door. The locking plate component is generally rectangular in shape but can be any suitable shape as is known in the art. Further, the locking plate component comprises two leg portions (or bracket portions) which extend out from the body of the locking plate component. The locking plate component is secured to a top edge of the sliding door. Once in place on the door, the locking plate component is secured flat against the top of the door, such that its pair of legs hang down the door on either side. Specifically, the two leg portions extend outwardly from the plate at substantially right angles and contact the door. The two leg portions also comprise at least one through-hole which accepts a screw for securing the plate to the door. The locking plate component could also be secured by a plurality of spaced screws extending through holes in the plate, the screws preferably being countersunk in the plate.

In one embodiment, the body of the locking plate comprises a rectangular cut-out or other suitably shaped cut-out. The cut-out can be any suitable shape or size as is known in the art depending on the needs and/or wants of a user.

In another embodiment, the automatic stall latch device comprises a wedge component secured to a door frame. The wedge component is configured in a triangular shape, such like a ramp. In operation, the locking plate component contacts the wedge component, and then rides up the hypotenuse of the wedge component until the rectangular cut-out encapsules or surrounds the wedge component locking the sliding door in place. Thus, when the door is closed, the locking plate component automatically engages the wedge component that is bolted to the top of the stall wall or door frame, next to the closed door. Typically, the wedge component would be secured to the door frame via a bracket and screws or any other suitable securing means as is known in the art.

In one embodiment, the automatic stall latch device comprises a narrow rod secured vertically on the door via brackets and screws or any other suitable securing means as is known in the art. The rod can be any suitable shape as is known in the art but is typically cylindrical. Specifically, the locking plate component comprises a pivot point on each leg portion, such that a screw or pin is placed in the through-hole positioned therein. The screw or pin creates the pivot point which allows the locking plate component to pivot on the wedge component, fully engaging the wedge component.

In operation, the narrow rod secured on the door contacts the locking plate component when the locking plate component is secured on the wedge component. Specifically, moving the narrow rod up toward the top of the door, causes the narrow rod to contact the locking plate component. The narrow rod then pushes the locking plate component up and off of the wedge component, freeing the locking plate component from the wedge component and allowing the door to slide open. Accordingly, the narrow rod can be actuated to open the stall door.

Generally, the narrow rod would be half or less than half the height of the door or any other suitable height as is known in the art. Further, the weight of the rod allows the locking plate component to disengage from the wedge component and allows full engagement of the wedge component when the device is locked. Thus, the weight of the rod brings the locking plate component back down after engagement with the wedge component closing the locking plate component over the wedge component.

In operation, when the sliding door is in a closed position, the rectangular cut-out of the locking plate component is substantially aligned with the wedge component, securing the sliding door in place, and preventing against the accidental displacement or movement of the sliding door by cattle and/or the wind. Further, the wedge component and the locking plate component prevent the backward sliding movement of the sliding door.

If a user desires to open the door from a closed position, the narrow rod is actuated to open the stall door. Specifically, if the sliding door is closed, upward pressure on the narrow rod causes the narrow rod to contact the locking plate component, pushing the locking plate component up and off of the wedge component. This causes the locking plate component to then drop downward out of engagement with the wedge component, allowing the sliding door to slide open. Generally, the sliding door cannot be opened from inside.

In yet another embodiment, the automatic stall latch device comprises a plurality of indicia.

In one embodiment, the automatic stall latch device and its components are manufactured from lightweight metals, such as stainless steel, aluminum, etc., heat-sealable plastic or polymers, such as polypropylene or acrylonitrile-butadiene-styrene (ABS), acrylics, polycarbonate, polyethylene, polyethylene terephthalate, polyvinyl chloride, polystyrene, etc., or any other suitable materials as is known in the art.

In yet another embodiment, a method of automatically locking a sliding door is disclosed. The method includes the steps of providing an automatic stall latch device comprising a locking plate and a wedge component that the plate slides over to lock the door, and a narrow rod installed on the side of the door which opens the door. The method also comprises sliding the door closed, which slides the locking plate over the wedge component. Further, the method comprises automatically locking the sliding door via the locking plate engaged with the wedge component. The method also comprises actuating the narrow rod which engages the wedge component, releasing the locking plate and unlocking the door. Finally, once the door is unlocked, allowing the door to slide open.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
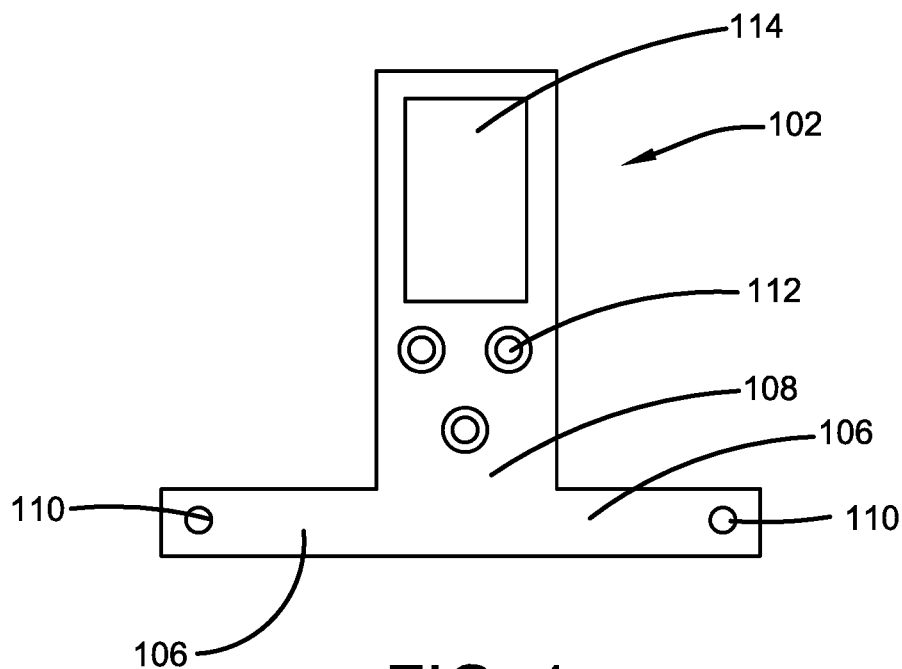
FIG. 1 illustrates a perspective view of one embodiment of the automatic stall latch device of the present invention disclosing the locking plate component in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an automatic stall latch device that provides livestock doors with an automatic locking latch designed to prevent injury to animals when entering or exiting the stall. There is also a long-felt need in the art for an automatic stall latch device that features a locking plate and wedge that accommodates a plate, allowing the plate to slide over the lock and be secured with a narrow rod. Further, there is a long-felt need in the art for an automatic stall latch device that eliminates the need for farmers and ranchers to manually apply the latch. Moreover, there is a long-felt need in the art for a device that reduces the chance of injury to any animals inside the stall. Further, there is a long-felt need in the art for an automatic stall latch device that can be retrofitted to any sliding door. Finally, there is a long-felt need in the art for an automatic stall latch device that automatically locks a sliding door in a closed position.

The present invention, in one exemplary embodiment, is a novel automatic stall latch device. The device comprises a locking plate and a wedge that the locking plate slides over to lock the door. A narrow rod is then installed on the side of the sliding door to operate the automatic latch. The locking plate is bolted to the top of the stall or sliding door and operated via the narrow rod that runs down the side of the door. The rod can be actuated to open the stall door. When the door is closed, the locking plate automatically connects to a wedge component that bolts to the top of the stall wall, next to the closed door. The present invention also includes a novel method of automatically locking a sliding door. The method includes the steps of providing an automatic stall latch device comprising a locking plate and a wedge component that the plate slides over to lock the door, and a narrow rod installed on the side of the door which opens the door. The method also comprises sliding the door closed, which slides the locking plate over the wedge component. Further, the method comprises automatically locking the sliding door via the locking plate engaged with the wedge component. The method also comprises actuating the narrow rod which engages the wedge component, releasing the locking plate and unlocking the door. Finally, once the door is unlocked, allowing the door to slide open.

Referring initially to the drawings, FIG. 1 illustrates a perspective view of one embodiment of the automatic stall latch device 100 of the present invention. In the present embodiment, the automatic stall latch device 100 is an improved automatic stall latch device 100 that can be retrofitted to any sliding door. Specifically, the device 100 is a secure automatic latch for stall doors that house livestock. The automatic stall latch device 100 comprises a locking plate component 102 and a wedge component 104 that the locking plate component 102 slides over to lock the sliding door 500. A narrow rod 300 is then installed on the side of the sliding door 500 to operate the automatic latch and allow the door 500 to slide open. Thus, the device 100 can automatically lock and unlock the sliding door 500 for animals entering and exiting the stall.

The automatic stall latch device 100 is shown for use on a sliding door 500, such as a barn door or stall door, but can be used on any suitable sliding door as is known in the art, depending on the needs and/or wants of a user. Specifically, the sliding door 500 is shown mounted to slide along an opening and adapted to close the opening in the frame of a building. The sliding door 500 would be any conventional sliding door as is known in the art. The top of the sliding door 500 would be mounted to the top of the door frame via rollers or any other suitable means which allow the sliding door 500 to slide open and close. Further, the automatic stall latch device 100 is applied to the sliding door 500 and the door frame or wall adjacent to the door opening, in which the sliding door 500 is hung.

Furthermore, the automatic stall latch device 100 comprises a locking plate component 102 which is secured to the sliding door 500. The locking plate component 102 is generally rectangular in shape but can be any suitable shape as is known in the art. Further, the locking plate component 102 comprises two leg portions 106 (or bracket portions) which extend out from the body 108 of the locking plate component 102. The locking plate component 102 is secured to a top edge 502 of the sliding door 500. Once in place on the door 500, the locking plate component 102 is secured flat against the top 502 of the door 500, such that its pair of leg portions 106 hang down the door 500 on either side. Specifically, the two leg portions 106 extend outwardly from the plate 102 at substantially right angles and contact the door 500. The two leg portions 106 also comprise at least one through-hole 110 which accepts a screw for securing the plate 102 to the door 500. The locking plate component 102 could also be secured by a plurality of spaced screws extending through holes 112 in the plate 102, the screws preferably being countersunk in the plate 102.

Additionally, the body 108 of the locking plate component 102 comprises a rectangular cut-out 114 or other suitably shaped cut-out. The cut-out 114 can be any suitable shape or size as is known in the art depending on the needs and/or wants of a user.

Figure 2:
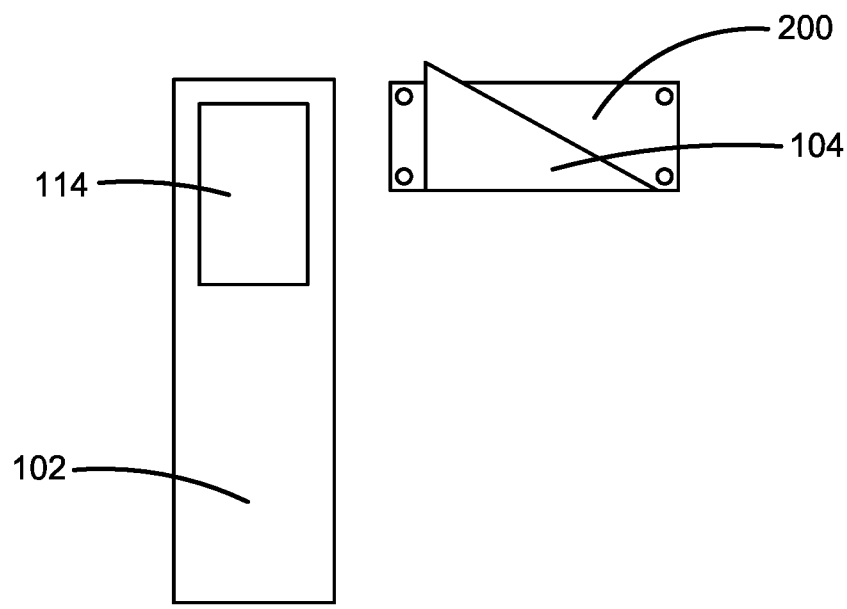
FIG. 2 illustrates a perspective view of one embodiment of the automatic stall latch device of the present invention disclosing multiple components of the device in accordance with the disclosed architecture.

As shown in FIG. 2, the automatic stall latch device 100 comprises a wedge component 104 secured to a door frame 504. The wedge component 104 is configured in a triangular shape, such like a ramp. In operation, the locking plate component 102 contacts the wedge component 104, and then rides up the hypotenuse of the wedge component 104 until the rectangular cut-out 114 encapsules or surrounds the wedge component 104 locking the sliding door 500 in place. Thus, when the door 500 is closed, the locking plate component 102 automatically engages the wedge component 104 that is bolted to the top of the stall wall or door frame 504, next to the closed door 500. Typically, the wedge component 104 would be secured to the door frame 504 via a bracket 200 and screws or any other suitable securing means as is known in the art.

Figure 3:
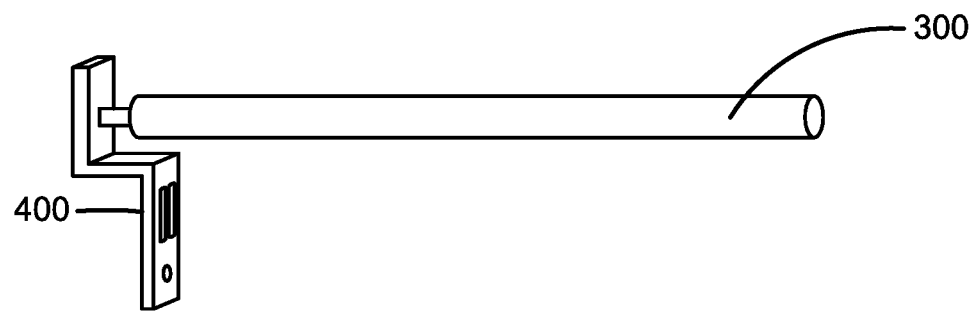
FIG. 3 illustrates a perspective view of one embodiment of the automatic stall latch device of the present invention disclosing the narrow rod for actuating the sliding door in accordance with the disclosed architecture.
Figure 4:
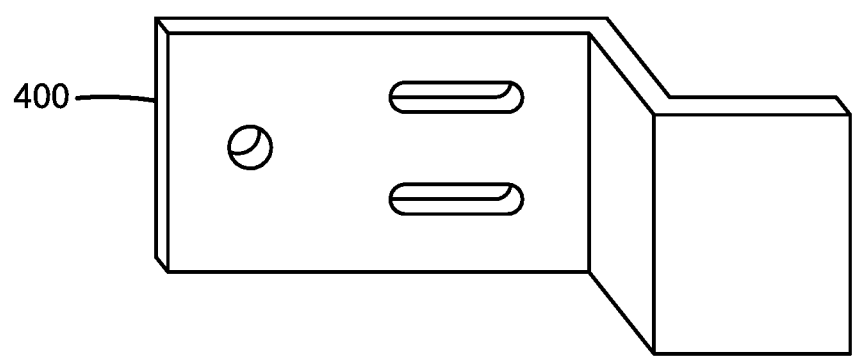
FIG. 4 illustrates a perspective view of one embodiment of the automatic stall latch device of the present invention disclosing the door brace component for securing the narrow rod in accordance with the disclosed architecture.

As shown in FIGS. 3-4, the automatic stall latch device 100 comprises a narrow rod 300 secured vertically on the door 500 via brackets 400 and screws or any other suitable securing means as is known in the art. The rod 300 can be any suitable shape as is known in the art but is typically cylindrical. Specifically, the locking plate component 102 comprises a pivot point 506 on each leg portion 106, such that a screw or pin 508 is placed in the through-hole 110 positioned therein. The screw or pin 508 creates the pivot point 506 which allows the locking plate component 102 to pivot on the wedge component 104 fulling engaging the wedge component 104.

In operation, the narrow rod 300 secured on the sliding door 500 contacts the locking plate component 102 when the locking plate component 102 is secured on the wedge component 104. Specifically, moving the narrow rod 300 up toward the top of the door 500 causes the narrow rod 300 to contact the locking plate component 102. The narrow rod 300 then pushes the locking plate component 102 up and off of the wedge component 104 freeing the locking plate component 102 from the wedge component 104 and allowing the door 500 to slide open. Accordingly, the narrow rod 300 can be actuated to open the stall door 500.

Generally, the narrow rod 300 would be half or less than half the height of the door 500 or any other suitable height as is known in the art. Further, the weight of the rod 300 allows the locking plate component 102 to disengage from the wedge component 104 and allows full engagement of the wedge component 104 when the device 100 is locked. Thus, the weight of the rod 300 brings the locking plate component 102 back down after engagement with the wedge component 104 closing the locking plate component 102 over the wedge component 104.

Figure 5:
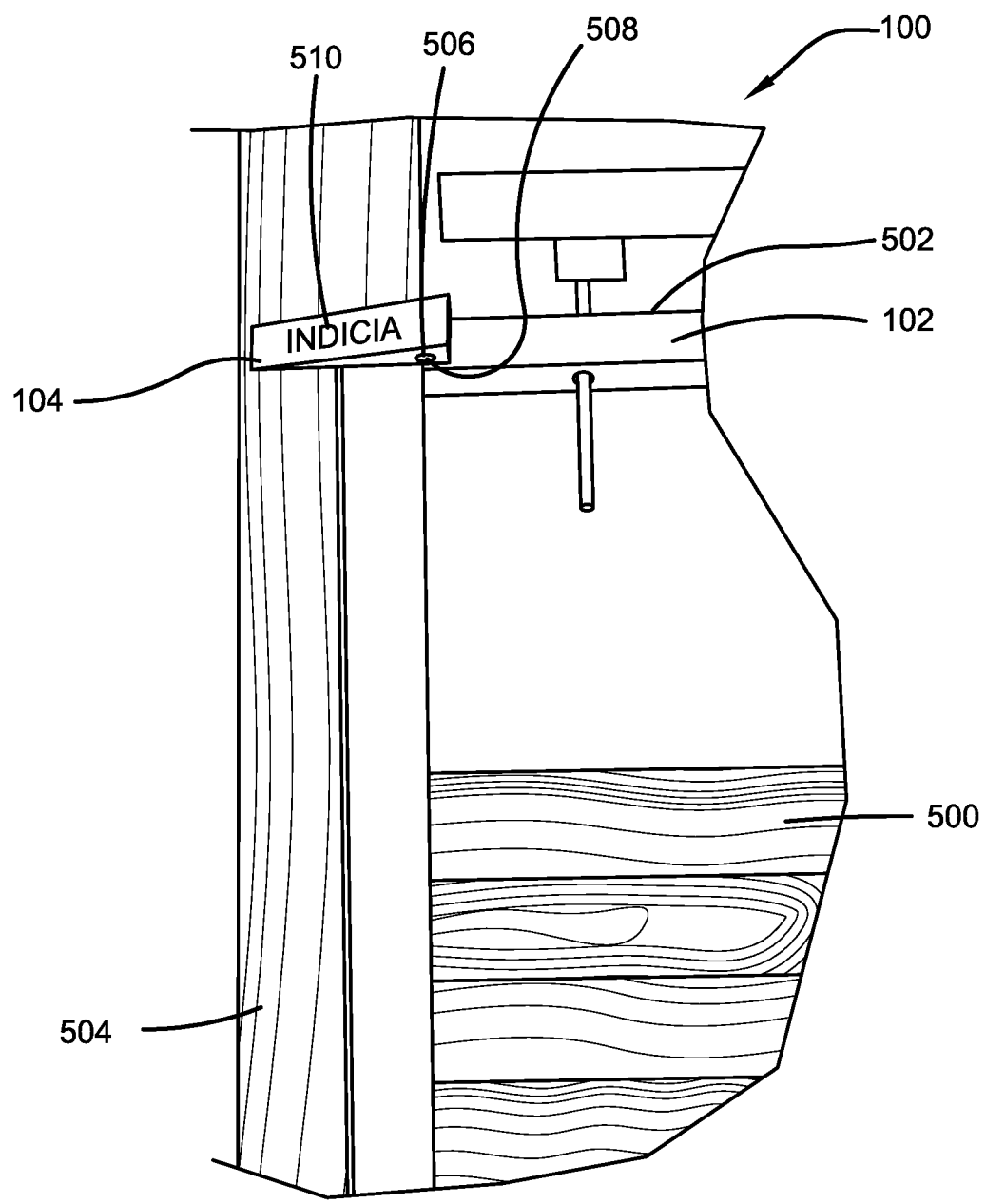
FIG. 5 illustrates a perspective view of one embodiment of the automatic stall latch device of the present invention in use in accordance with the disclosed architecture.

As shown in FIG. 5, in operation, when the sliding door 500 is in closed position, the rectangular cut-out 114 of the locking plate component 102 is substantially aligned with the wedge component 104 securing the sliding door 500 in place, and preventing against the accidental displacement or movement of the sliding door 500 by cattle and/or the wind. Further, the wedge component 104 and the locking plate component 102 prevent the backward sliding movement of the sliding door 500.

If a user desires to open the door 500 from a closed position, the narrow rod 300 is actuated to open the stall door 500. Specifically, if the sliding door 500 is closed, upward pressure on the narrow rod 300 causes the narrow rod 300 to contact the locking plate component 102 pushing the locking plate component 102 up and off of the wedge component 104. This causes the locking plate component 102 to then drop downward out of engagement with the wedge component 104 allowing the sliding door 500 to be slid open. Generally, the sliding door 500 cannot be opened from the inside.

Furthermore, the automatic stall latch device 100 comprises a plurality of indicia 510. The locking plate component 102 of the device 100 may include advertising, a trademark, or other letters, designs, or characters, printed, painted, stamped, or integrated into the locking plate component 102, or any other indicia 510 as is known in the art. Specifically, any suitable indicia 510 as is known in the art can be included, such as, but not limited to, patterns, logos, emblems, images, symbols, designs, letters, words, characters, animals, advertisements, brands, etc., that may or may not be door or brand related.

Additionally, the automatic stall latch device 100 and its components are manufactured from lightweight metals, such as stainless steel, aluminum, etc., heat-sealable plastic or polymers, such as polypropylene or acrylonitrile-butadiene-styrene (ABS), acrylics, polycarbonate, polyethylene, polyethylene terephthalate, polyvinyl chloride, polystyrene, etc., or any other suitable materials as is known in the art. Additionally, the automatic stall latch device 100 is also manufactured from a material that is water resistant or waterproof, or comprises a coating that is water resistant or waterproof.

Figure 6:
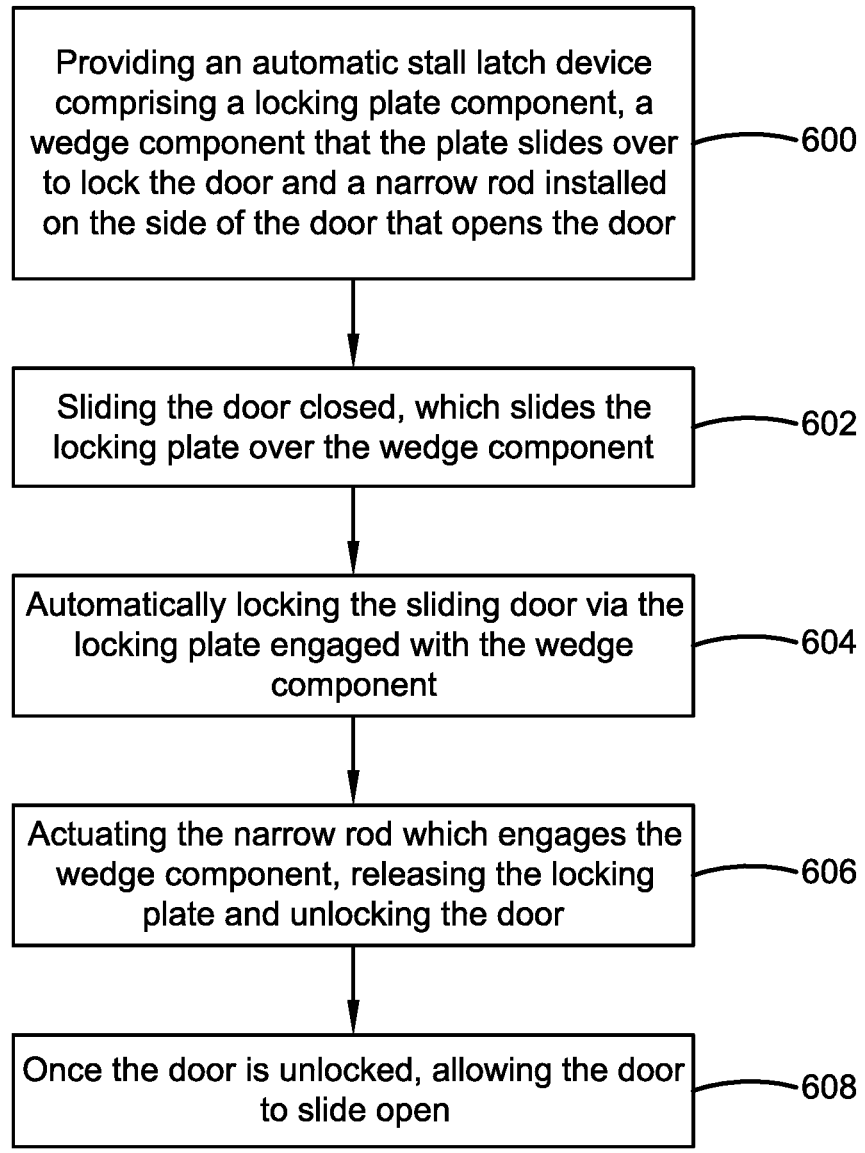
FIG. 6 illustrates a flowchart showing the method of automatically locking a sliding door in accordance with the disclosed architecture.

FIG. 6 illustrates a flowchart of the method of automatically locking a sliding door. The method includes the steps of at 600, providing an automatic stall latch device comprising a locking plate and a wedge component that the plate slides over to lock the door, and a narrow rod installed on the side of the door which opens the door. The method also comprises at 602, sliding the door closed which slides the locking plate over the wedge component. Further, the method comprises at 604, automatically locking the sliding door via the locking plate engaged with the wedge component. The method also comprises at 606, actuating the narrow rod which engages the wedge component releasing the locking plate and unlocking the door. Finally, at 608, once the door is unlocked, allowing the door to slide open.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "automatic stall latch device", "latch device", and "device" are interchangeable and refer to the automatic stall latch device 100 of the present invention.

Notwithstanding the foregoing, the automatic stall latch device 100 of the present invention can be of any suitable size and configuration as is known in the art without affecting the overall concept of the invention, provided that it accomplishes the above-stated objectives. One of ordinary skill in the art will appreciate that the automatic stall latch device 100 as shown in FIGS. 1-6 are for illustrative purposes only, and that many other sizes and shapes of the automatic stall latch device 100 are well within the scope of the present disclosure. Although the dimensions of the automatic stall latch device 100 are important design parameters for user convenience, the automatic stall latch device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automatic stall latch device that can be retrofitted to any sliding door, the automatic stall latch device comprising:
   a locking plate component;

a wedge component; and a narrow rod secured to a sliding door and in contact with the locking plate component;

wherein the locking plate component slides over the wedge component to secure the sliding door in a closed position;

wherein the locking plate component comprises two leg portions which extend out from a body of the locking plate component;

wherein the locking plate component is secured to a top edge of the sliding door with the two leg portions hanging down on either side;

wherein the two leg portions comprise at least one through-hole which accepts a screw for securing the locking plate component to the sliding door;

wherein the wedge component is secured to a door frame via a bracket and screws;

wherein the wedge component is configured in a triangular shape and the locking plate component rides up a hypotenuse of the wedge component until the rectangular cut-out encapsules the wedge component; and further wherein the narrow rod contacts the locking plate component, when the locking plate component is secured on the wedge component, freeing the locking plate component from the wedge component and allowing the sliding door to slide open.

2. The automatic stall latch device of claim 1, wherein the narrow rod is secured vertically on the sliding door via brackets and screws.

3. The automatic stall latch device of claim 2, wherein when the narrow rod is moved upward to contact the locking plate component, the narrow rod pushes the locking plate component up and off of the wedge component.

4. The automatic stall latch device of claim 3, wherein the locking plate component comprises a pivot point on each of the two leg portions, such that a pin is placed in the at least one through-hole positioned therein to create the pivot point which allows the locking plate component to pivot on the wedge component, fulling engaging the wedge component.

5. The automatic stall latch device of claim 4 further comprising a plurality of indicia.

6. An automatic stall latch device that can be retrofitted to any sliding door, the automatic stall latch device comprising:

a locking plate component comprising two leg portions which extend out from a body of the locking plate component and a rectangular cut-out;

a wedge component secured to a door frame; and a narrow rod secured to a sliding door and in contact with the locking plate component;

wherein the wedge component is configured in a triangular shape and the locking plate component rides up a hypotenuse of the wedge component until the rectangular cut-out encapsules the wedge component to secure the sliding door in a closed position; and further wherein when the narrow rod is moved upward to contact the locking plate component, the narrow rod pushes the locking plate component up and off of the wedge component, freeing the locking plate component from the wedge component and allowing the sliding door to slide open.

7. The automatic stall latch device of claim 6 further comprising a plurality of indicia.

8. The automatic stall latch device of claim 6, automatic stall latch device wherein the locking plate component is secured to a top edge of the sliding door with the two leg portions hanging down on either side.

9. The automatic stall latch device of claim 8, wherein the two leg portions comprise at least one through-hole which accepts a screw for the securing the locking plate component to the sliding door.

10. The automatic stall latch device of claim 6, wherein the locking plate component comprises a pivot point on each of the two leg portions, such that a pin is placed in the at least one through-hole positioned therein to create the pivot point which allows the locking plate component to pivot on the wedge component, fulling engaging the wedge component.

11. The automatic stall latch device of claim 6, wherein the narrow rod is secured vertically on the sliding door via brackets and screws.

12. The automatic stall latch device of claim 6, wherein the wedge component is secured to the door frame via a bracket and screws.

* * * * *